US006409064B1

(12) United States Patent
Bayley

(10) Patent No.: US 6,409,064 B1
(45) Date of Patent: Jun. 25, 2002

(54) LOCKING TOOL BOX

(76) Inventor: Jason S. Bayley, 7 Rowan Dr., Aliso Viejo, CA (US) 92656

(*) Notice: Subject to any disclaimer, the term of this patent is extended or adjusted under 35 U.S.C. 154(b) by 0 days.

(21) Appl. No.: 09/660,609

(22) Filed: Sep. 13, 2000

(51) Int. Cl.[7] .................................. B60R 9/00
(52) U.S. Cl. ................... 224/404; 296/37.6; 220/211; 49/138
(58) Field of Search .................. 224/402, 403, 224/404; 296/37.6; 220/211; 49/138

(56) References Cited

U.S. PATENT DOCUMENTS

| | | | | |
|---|---|---|---|---|
| 2,833,536 A | * | 5/1958 | Joachim et al. | 49/138 X |
| 3,343,303 A | * | 9/1967 | Wanlass | 49/138 X |
| 3,713,472 A | * | 1/1973 | Dozois | 296/56 X |
| 4,101,162 A | * | 7/1978 | Koehn | 296/37.6 X |
| 4,739,585 A | * | 4/1988 | Pickles | 49/280 |
| 4,936,624 A | * | 6/1990 | West | 296/37.6 |
| 5,094,499 A | * | 3/1992 | Simone, Jr. | 296/100 |
| 5,123,691 A | | 6/1992 | Ginn | |
| 5,727,835 A | * | 3/1998 | Krush et al. | 296/37.6 |
| 5,896,703 A | * | 4/1999 | Wright et al. | 49/339 |
| 5,909,921 A | * | 6/1999 | Nesbeth | 296/100.1 |
| 5,967,392 A | * | 10/1999 | Miemi et al. | 224/404 |

OTHER PUBLICATIONS

Adrian Steel Catalog PV/30M/0100, 2000 Pickup Equipment at cover and pp. 1–3.

* cited by examiner

Primary Examiner—Stephen K. Cronin
(74) Attorney, Agent, or Firm—Porter, Wright, Morris & Arthur, LLP.

(57) ABSTRACT

A tool box is provided that includes a hollow container having at least one lid that may be opened or closed and means for opening and closing the lid. The means for opening and closing the lid are actuated by control means that is operatively attached thereto. The lid is locked into position by the means for opening and closing the lid when the means are not actuated by the control means. The means for opening and closing the lid are capable of stopping the lid at any position between a completely closed position and a completely open position. The means for opening and closing the lid include a motor with a worm gear operatively attached. A drive gear is operatively attached to the worm gear, and a lift arm is operatively attached to the drive gear. The lift arm is attached so as to move in coordination with the drive gear. The lid has a channel attached to it, in which the arm is slideably engaged so as to slide when the arm is moved by the drive gear.

11 Claims, 6 Drawing Sheets

LOCKING TOOL BOX

FIELD OF THE INVENTION

This invention relates to tool boxes and, more specifically, to tool boxes of the type typically installed in pickup trucks.

BACKGROUND AND SUMMARY OF THE INVENTION

Side mount, saddle and crossover mount tool boxes are commonly used in the beds of pickup trucks to store tools and other items. (See, for example, Adrian Steel Catalog PV/30M/0100, 2000 Pickup Equipment at cover and pages 1–3.) Some of these tool boxes are provided with lock and key systems on their lids to prevent thefts. To access the contents of such tool boxes, the driver must place a key into the tool box lock and manually lift the lid. This inconveniences the driver by requiring him to always maintain control of the keys to the lid as well as by requiring the driver to manually lift what may be a heavy lid every time he wishes to gain access to the contents of the tool box.

The present invention provides a tool box which overcomes at least some of the above-noted problems of the related art. According to the present invention, a tool box is provided that includes a hollow container with at least one lid that can be opened and closed. Motorized or other mechanically actuated means for opening and closing the tool box lid are provided that are actuated by electronic control means. The tool box also includes a storage volume within the hollow container.

In a preferred embodiment of the invention, the lid is locked into position by mechanized means for opening and closing the lid when the means are not actuated. It is preferable that the means for opening and closing the lid are capable of maintaining the lid at any position between a completely closed position and a completely open position.

In one embodiment of the invention, electronic control means are operatively interconnected to the mechanical means for opening and closing the lid. In another embodiment of the invention, the control means is a remote control device installed in the pickup truck cab or a conventional pocket or keychain remote control.

In the preferred embodiment of the invention, the means for opening and closing the lid includes a motor with a worm gear operatively attached. A drive gear is operatively attached to the worm gear, and a lift arm is operatively attached to the drive gear. The lift arm is attached to the drive gear so as to move in coordination with the drive gear. The lid has a channel attached in which the arm is slideably engaged so as to slide when the arm is moved by the drive gear. An electric or hydraulic linear actuator is similarly useful as the mechanical means for effecting the lid movement.

The present invention offers numerous advantages. One advantage is that the tool box provides a locking mechanism that operates without, or as a supplement to, the use of a traditional lock and key system. Another advantage of the present invention is that the lid of the tool box can be stopped and locked into place at any position between a completely closed position and a completely open position. Yet another advantage of the present invention is that the lid of the tool box is raised and lowered by automated means, and the lid is not raised or lowered manually by hand.

Still other benefits and advantages of the invention will become apparent to those skilled in the art to which it pertains upon a reading and understanding of the following detailed specification.

It should be understood that the appended drawings are not necessarily to scale, presenting a somewhat simplified representation of various preferred features illustrative of the basic principles of the invention.

DESCRIPTION OF THE PREFERRED EMBODIMENTS

As illustrated in FIGS. 1–4, a tool box 10 is provided for securely storing items. While the illustrated embodiments of the present invention are particularly adapted for use with a tool box on a motor vehicle such as a pickup truck 11 (shown in phantom in FIG. 1), it is noted that the present invention can be utilized with other containers of any shape and can be utilized in locations other than in a motor vehicle. Other embodiments and design variations will be apparent to those skilled in the art given the benefit of this disclosure.

Figure 1:
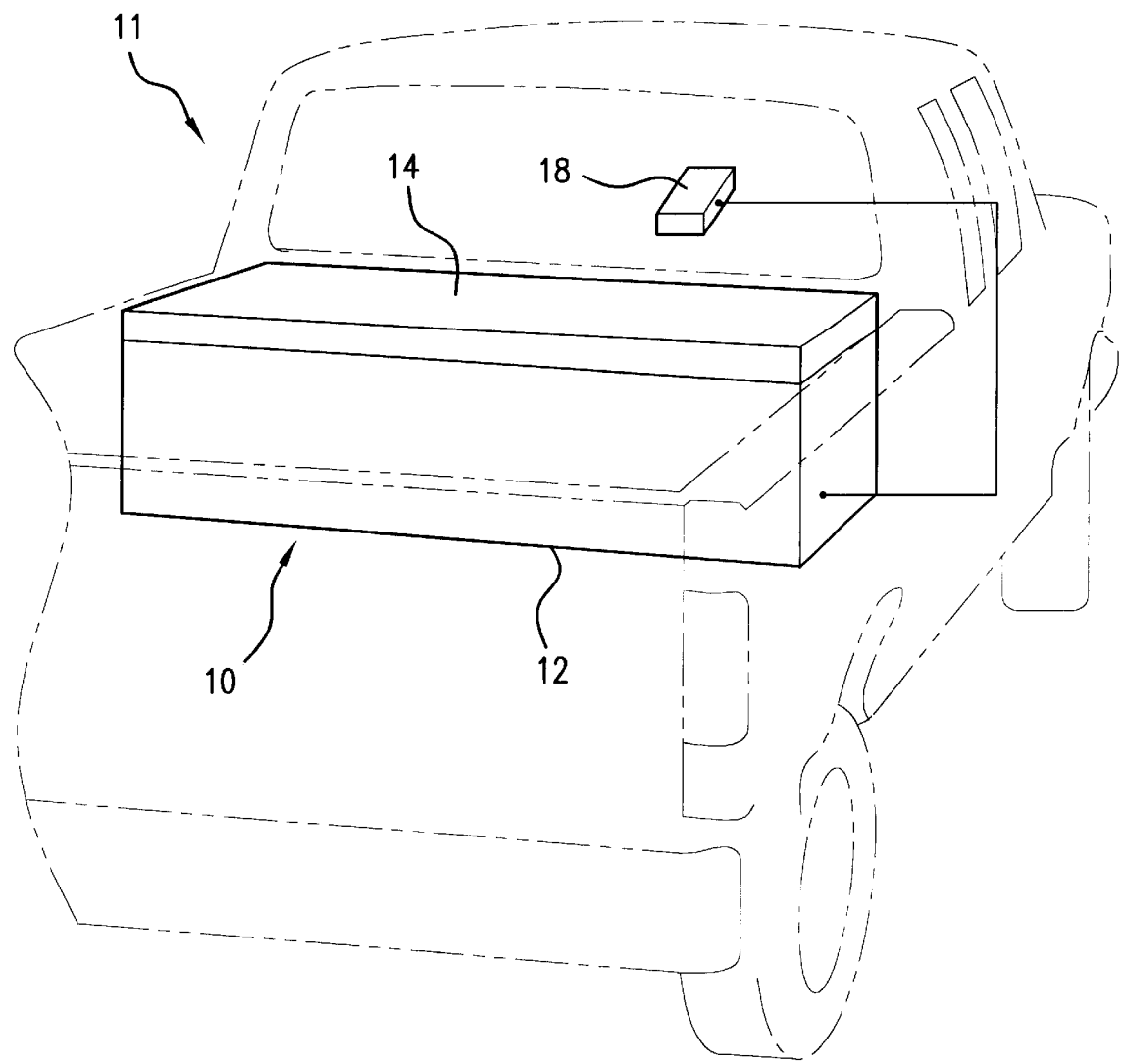
FIG. 1 is a perspective view of a preferred embodiment of the tool box of the present invention shown in the bed of a pickup truck with the lid of the tool box closed.
Figure 2:
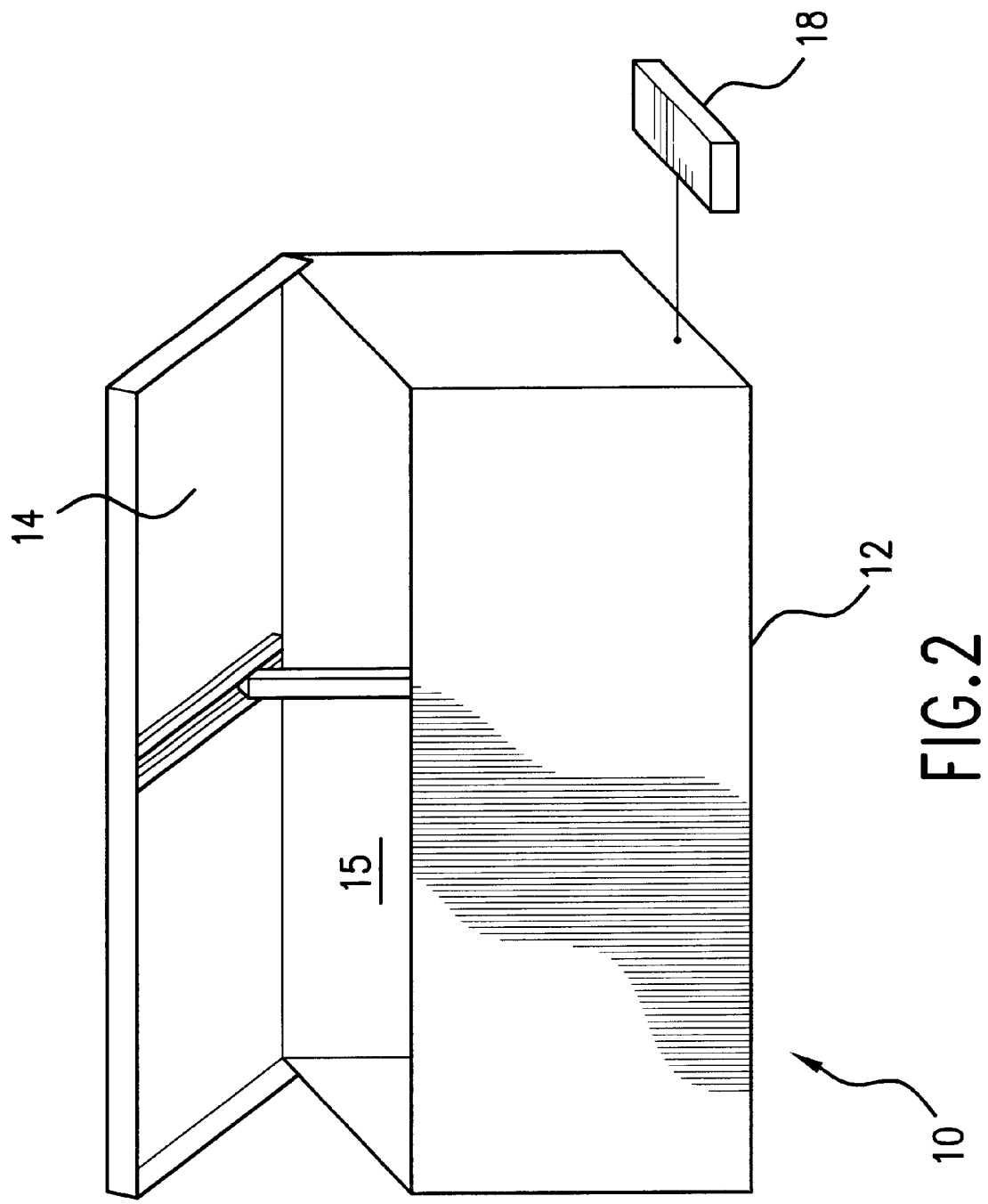
FIG. 2 is a perspective view of the tool box of FIG. 1 shown with the lid opened.

As illustrated in FIGS. 1–4, the preferred embodiment includes a hollow container 12 for storing tools and other items. The box 12 includes at least one lid 14 that is openable and closeable and a storage volume 15 (FIG. 2). The tool box 10 also includes means 16 (FIGS. 3–4) for opening and closing the lid 14. The means 16 are actuated by control means 18, which is alternatively installed in the pickup truck 11, for example, at the dashboard, or is a contained wireless keychain or pocket remote control.

Figure 3:
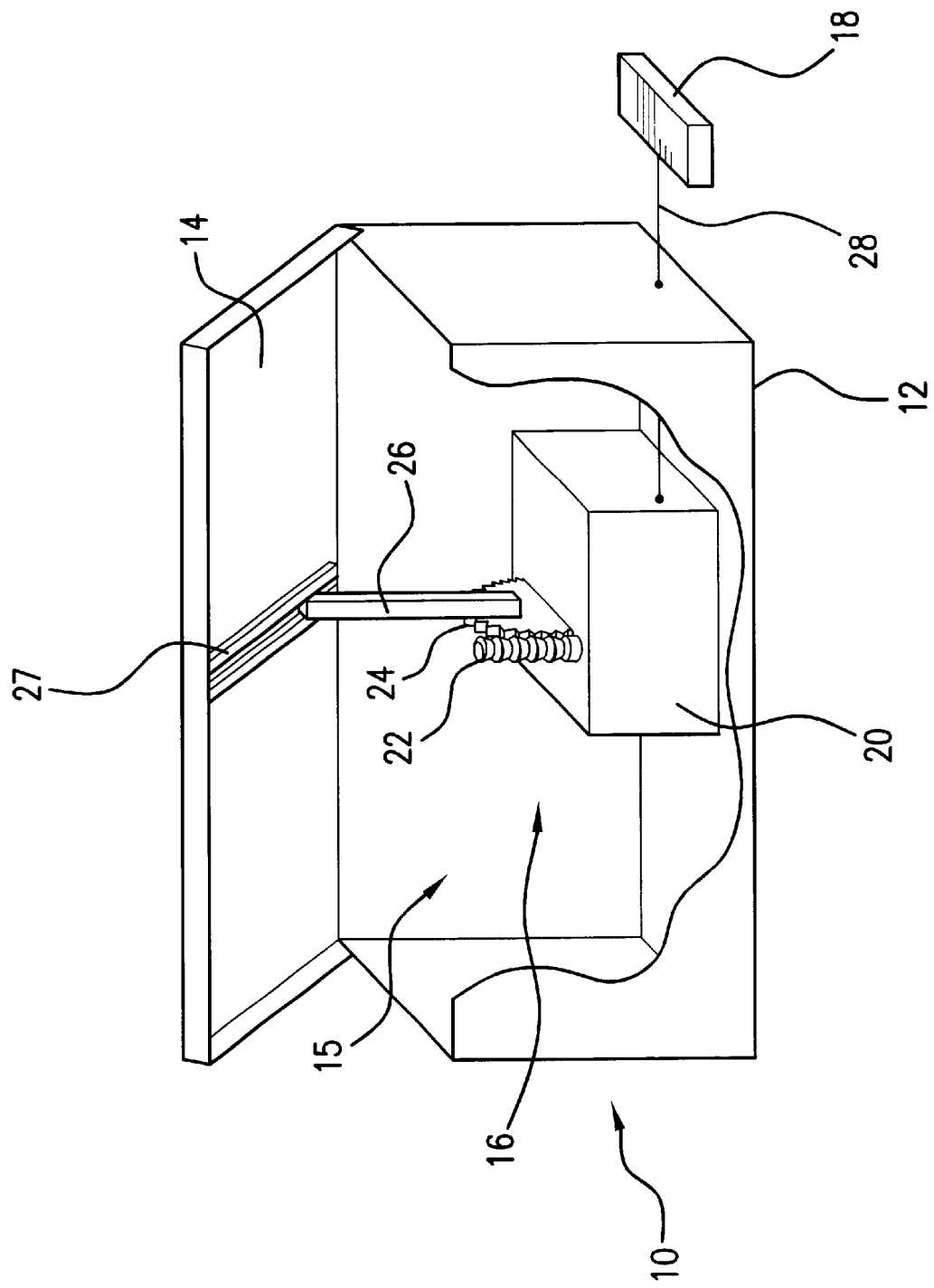
FIG. 3 is a perspective view of the tool box of FIG. 2 shown with a portion of the tool box broken away.
Figure 4:
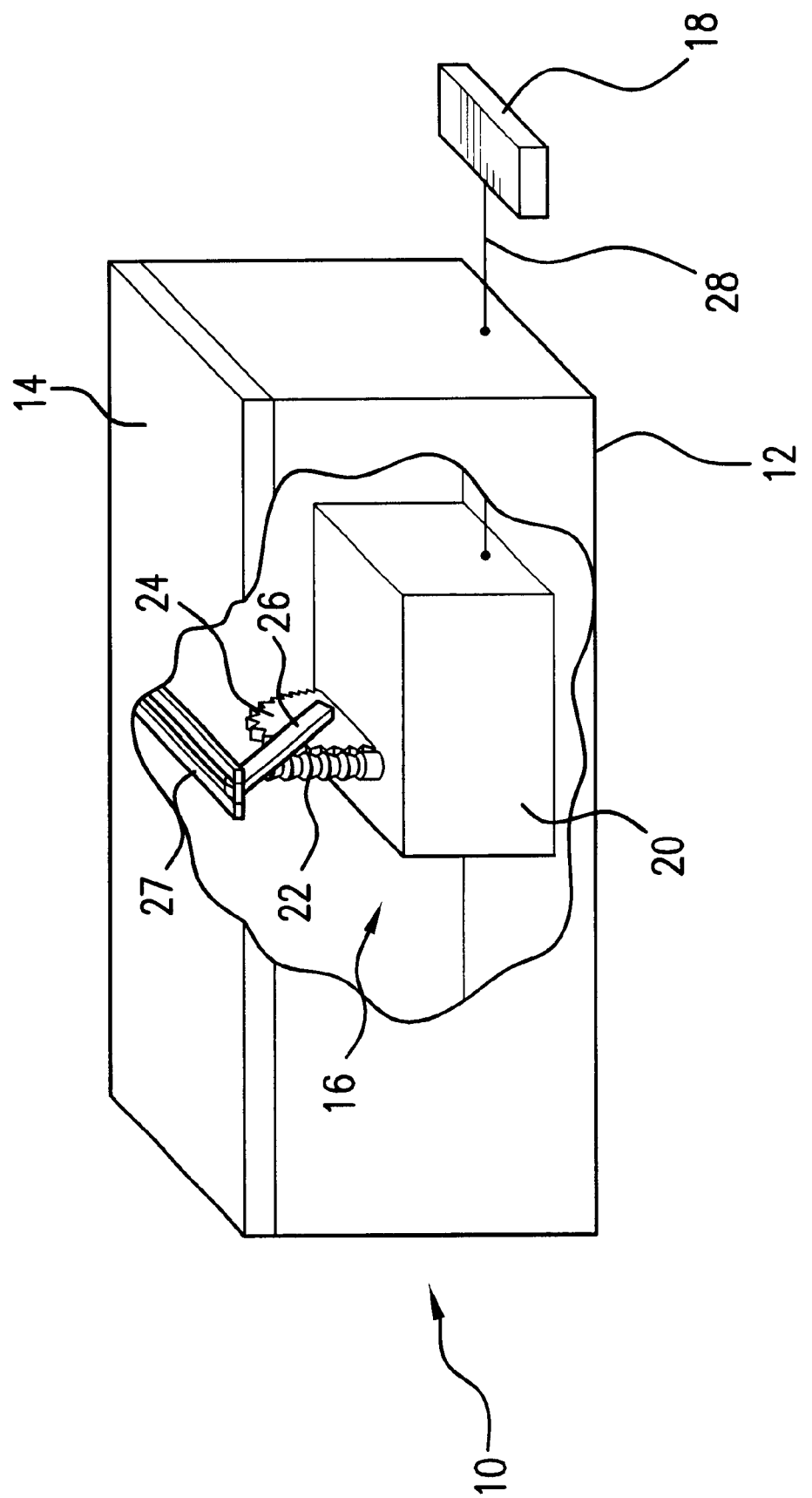
FIG. 4 is a perspective view of the tool box of FIG. 1 shown with a portion of the tool box broken away.

As illustrated in FIGS. 3 and 4, the means 16 for opening and closing the lid 14 of the preferred embodiment of the invention include a rotary motor 20 having a worm gear 22 operatively attached; a drive gear 24 operatively attached to the worm gear 22; a lift arm 26 operatively attached to the drive gear 24 so that it moves in coordination with the drive gear 24; and a channel 27 attached to the lid 14. The arm 26 is slideably engaged with the channel 27 so that the arm 26 slides in the channel 27 when the arm 26 is moved by the drive gear 24. When the motor 20 is caused to drive the worm gear 22, the motion is transferred to the drive gear 24, which in turn causes the lift arm 26 to slide in the channel 27 and move the lid 14. The arm 26 is positioned near the front of the lid 14 in the channel 27 when the lid 14 is closed and is positioned near the back of the lid 14 in the channel 27 when the lid 14 is open. In one embodiment, a conventional electric car window actuator is suitable adapted for use as the means 16 for opening and closing the lid 14. The direction of the motor 20 controls the direction that the lid 14 will be moved. It will be recognized by those skilled in the art that other means for opening and closing the lid 14, such as, for example, a linear motor and drive arm or an electric or hydraulic linear actuator, can be used in the present invention.

Figure 4A:
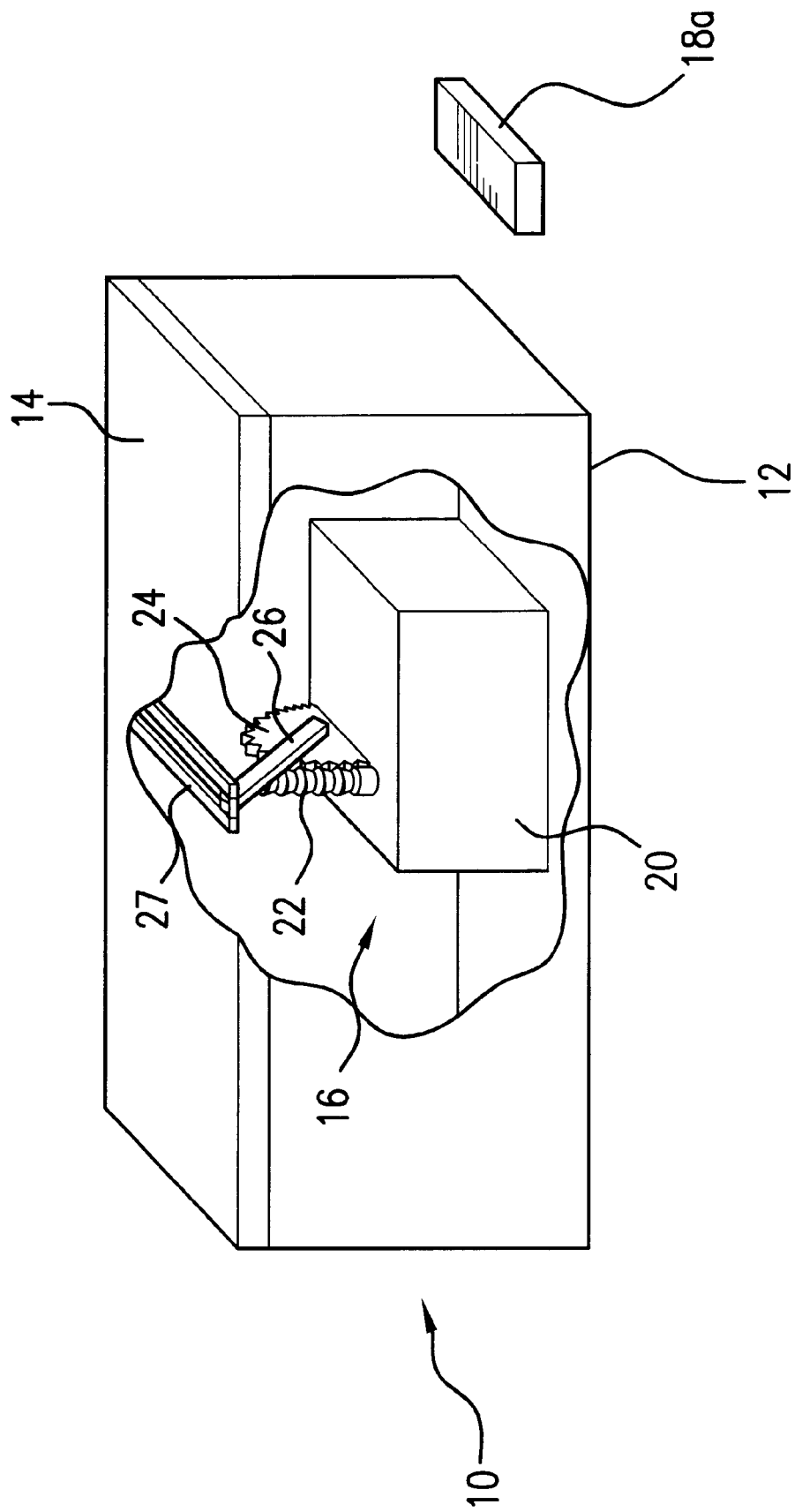
FIG. 4A is a perspective view of an alternative embodiment of the tool box of the present invention shown with a portion of the tool box broken away.

In the preferred embodiment of the invention, the control means 18 are operatively attached to the means 16 for opening and closing the lid 14. As shown in FIG. 4, wires 28 connect the control means 18 to the motor 20. The control means 18 would be placed in the cab of a typical pickup truck 11 having the tool box 10 in the bed of the truck 11 (FIG. 1), allowing a user to open and close the lid 14 or stop the motion of the lid 14 at any point in between a completely open position and a completely closed position. In the preferred embodiment, the control means 18 is a switch for turning the motor 20 on, turning the motor 20 off, and reversing the polarity of the motor 20, thereby reversing the direction of the motor 20 and the direction of the lid 14. In an alternative embodiment, as shown in FIG. 4A, the control means 18A is a wireless remote control device that is not hard wired to the motor 20. Using such an alternative embodiment would afford more security, as the control means 18 would not be left in the cab of a truck 11 when a user was away from the truck 11.

The lid 14 is preferably locked into position by the means 16 for opening and closing the lid 14 when the lid 14 is not being moved by the means 16. In the preferred embodiment, this is accomplished as a result of the motor 20, worm gear 22, and drive gear 24 not rotating when the motor 20 is not activated by the control means 18. This feature provides a locking mechanism for the tool box 10 without the use of a traditional lock and key system.

The means 16 for opening and closing the lid 14 are preferably capable of stopping the lid 14 at any position between a completely closed position and a completely open position. In the preferred embodiment of the invention, the control means 18 can stop the motion of the motor 20 at any point of motion of the lid 14, thereby locking the lid 14 in that position until the motor 20 is once again actuated by the control means 18.

Figure 5:
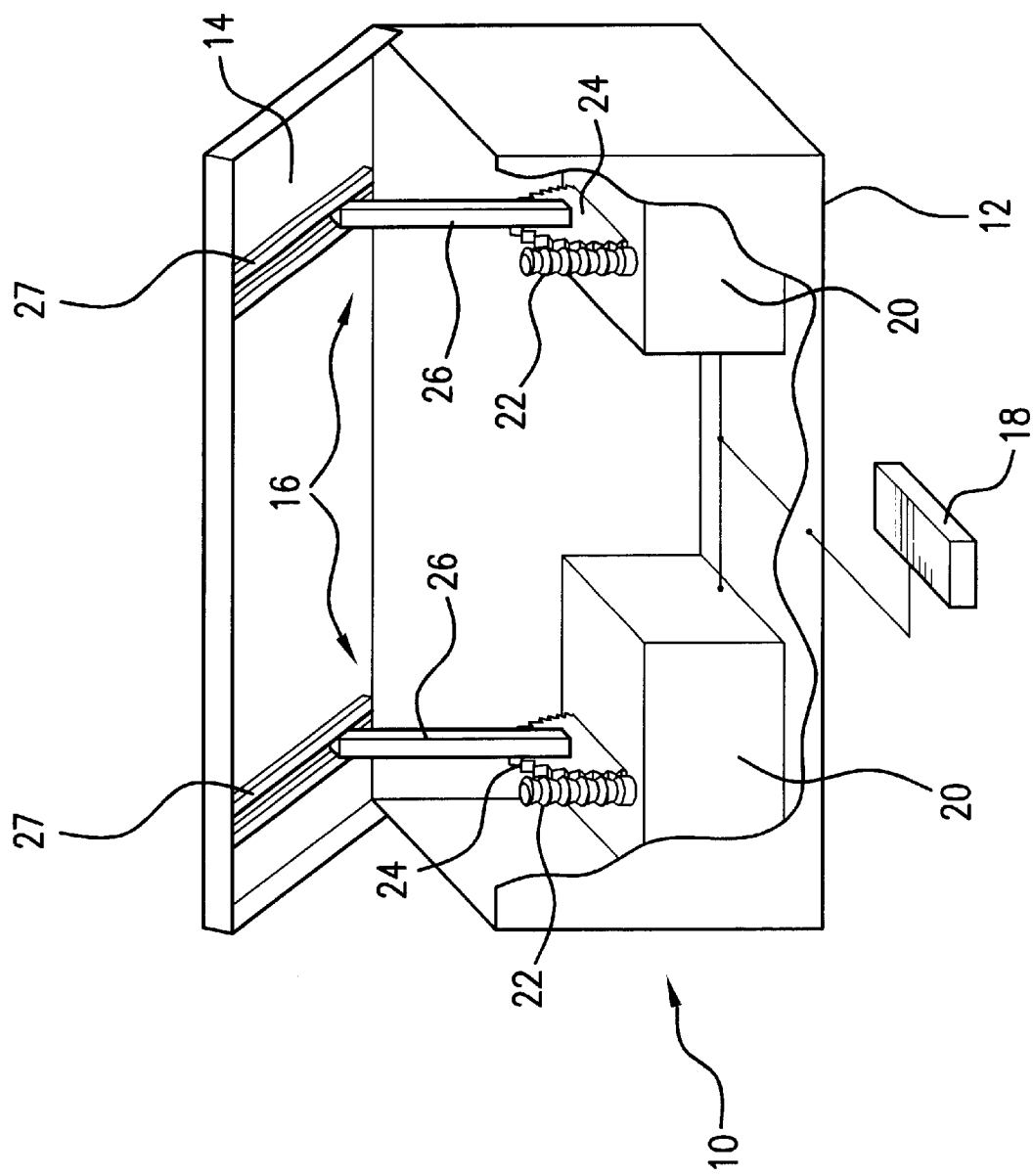
FIG. 5 is a perspective view of another alternative embodiment of the tool box of the present invention shown with a portion of the tool box broken away.

As illustrated in FIGS. 2, 3, and 4, one embodiment of the invention includes only one motor 20 with one worm gear 22, one drive gear 24, and one arm 26. In this embodiment, the means 16 for opening and closing the lid 14 are positioned in the middle of the storage volume 15 of the hollow container 12. However, the means 16 for opening and closing the lid 14 may be placed anywhere within the hollow container 12. In an alternative embodiment, as illustrated in FIG. 5, the tool box 10 may include multiple means 16 for opening and closing the lid 14. As illustrated in FIG. 5, the tool box 10 includes two motors 20 with two worm gears 22, two drive gears 24, and two lift arms 26. By increasing the number of means 16 for opening and closing the lid 14, the strength of the lock formed when the motor 20 is stopped is increased, and more weight may be lifted by the means 16. In the alternative embodiment illustrated in FIG. 5, both motors 20 are controlled by the same control means 18. As mentioned above, the control means 18 may be wired to the motor 20 or may be a remote control device that is not wired to the motor 20.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the tool box any other shape and may be used in locations other than the bed of a motor vehicle. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A tool box comprising:
   a container having at least one lid, said lid being openable and closeable; and
   mechanized means for opening and closing the lid, said means for opening and closing the lid being actuated by control means, said control means comprising a wireless remote control for a switch operatively attached to the means for opening and closing the lid.

2. A tool box comprising:
   a container having at least one lid, said lid being openable and closeable; and
   mechanized means for opening and closing the lid, said means for opening and closing the lid being actuated by control means wherein said means for opening and closing the lid comprise:
   a motor having a worm gear operatively attached;
   a drive gear operatively connected to said worm gear;
   an arm operatively attached to said drive gear so as to move in coordination with said drive gear; and
   a channel attached to said lid, said arm being slideably engaged with said channel so as to slide in said channel when the arm is moved by said drive gear.

3. The tool box of claim 2 wherein:
   said container includes a storage volume;
   said lid is locked into position by said means for opening and closing the lid when said means are not actuated;
   said means for opening and closing the lid are capable of stopping the lid at any position between a completely closed position and a completely open position; and
   said control means are operatively attached to the means for opening and closing the lid.

4. The tool box of claim 3, wherein said control means is a remote control device.

5. A tool box for use in a bed of a pickup truck comprising:
   a container having at least one lid, said lid being openable and closeable; and
   mechanized means for opening and closing the lid, said means for opening and closing the lid being actuated by an electronic control means;
   wherein said container is attached to the bed of the pickup truck; and
   wherein said means for opening and closing the lid comprise:
   a motor having a worm gear operatively attached;
   a drive gear operatively connected to said worm gear;
   an arm operatively attached to said drive gear so as to move in coordination with said drive gear; and
   a channel attached to said lid, said arm being slideably engaged with said channel so as to slide in said channel when the arm is moved by said drive gear.

6. The tool box of claim 5 said means for opening and closing the lid are capable of stopping the lid at any position between a completely closed position and a completely open position.

7. The tool box of claim 5 wherein said control means is a remote control device.

8. The tool box of claim 5 in which the means for opening and closing the lid includes a linear actuator.

9. The tool box of claim 5 wherein said control means are operatively attached to the means for opening and closing the lid.

10. The tool box of claim 9 in which the control means for opening and closing the lid is installed in the cab of the pickup truck.

11. A tool box for the bed of a pickup truck comprising:

a box container adapted to be attached to the bed of a pickup truck, the container having at least one lid which is openable and closeable;

a motor means for opening and closing the lid, said means for opening and closing the lid being actuated by an electronic control means; said motor activating a worm gear operatively attached to a drive gear operatively connected to an arm, said arm being slideably engaged with a channel in the container lid, such that the motor, drive gear, worm gear, arm and channel cooperatively interact so as to move the lid between an open position and a closed position in coordination with the actuation of the motor;

the control means for actuating the motor being operatively interconnected with the motor in a manner such that the control means is capable of actuating the motor to stop movement of the lid at any position between a closed position and an open position, the control means being remotely positioned with respect to the tool box.

* * * * *